United States Patent
Harmon et al.

(10) Patent No.: US 11,689,908 B2
(45) Date of Patent: Jun. 27, 2023

(54) CONNECTIONLESS OBTAINMENT OF DYNAMIC INFORMATION OVER WIRELESS TRANSMISSION

(71) Applicant: Hach Company, Loveland, CO (US)

(72) Inventors: Brian Alan Harmon, Loveland, CO (US); Gregory James Lipinski, Loveland, CO (US); Joseph Rockstan Williams, Greeley, CO (US); Theophilus Brian Mooney, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 0 days.

(21) Appl. No.: 17/085,612

(22) Filed: Oct. 30, 2020

(65) Prior Publication Data

US 2021/0136552 A1 May 6, 2021

Related U.S. Application Data

(60) Provisional application No. 62/929,603, filed on Nov. 1, 2019.

(51) Int. Cl.
| | |
|---|---|
| H04W 84/18 | (2009.01) |
| H04W 4/80 | (2018.01) |
| H04W 76/14 | (2018.01) |
| H04W 8/00 | (2009.01) |
| H04W 4/38 | (2018.01) |
| H04W 12/033 | (2021.01) |

(52) U.S. Cl.
CPC ............ *H04W 4/80* (2018.02); *H04W 4/38* (2018.02); *H04W 8/005* (2013.01); *H04W 12/033* (2021.01); *H04W 76/14* (2018.02); *H04W 84/18* (2013.01)

(58) Field of Classification Search
CPC .................................................. H04L 1/1874
See application file for complete search history.

(56) References Cited

U.S. PATENT DOCUMENTS

| | | | |
|---|---|---|---|
| 9,882,610 B1 | 1/2018 | Baker et al. | |
| 10,523,685 B1 * | 12/2019 | Kostka | H04W 12/08 |
| 10,827,324 B1 * | 11/2020 | Hajimiri | H04W 4/029 |

(Continued)

OTHER PUBLICATIONS

Chakrabarty Shaibal et al: "Black networks for Bluetooth Low Energy".

(Continued)

*Primary Examiner* — Cindy Trandai
(74) *Attorney, Agent, or Firm* — Ference & Associates LLC

(57) ABSTRACT

An embodiment provides a method for transferring information from at least one instrument to an application, including: establishing a central protocol structure, wherein the central protocol structure defines a format for information transmitted utilizing the central protocol structure; receiving, at the application and over a wireless communication channel information from the at least one instrument, wherein the information is formatted in view of the central protocol structure; and performing, within the application, an action with respect to the information within the application, wherein the performing comprises deciphering the information contained in view of the central protocol structure.

22 Claims, 2 Drawing Sheets

(56) References Cited

U.S. PATENT DOCUMENTS

| | | | |
|---|---|---|---|
| 2003/0147515 A1 | 8/2003 | Kai et al. | |
| 2007/0155372 A1* | 7/2007 | Huang | H04L 67/04 455/418 |
| 2010/0083281 A1* | 4/2010 | Malladi | H04L 67/34 719/317 |
| 2013/0065584 A1* | 3/2013 | Lyon | H04W 4/80 455/434 |
| 2013/0188538 A1* | 7/2013 | Kainulainen | G01S 1/08 370/310 |
| 2013/0214909 A1* | 8/2013 | Meijers | H04W 4/029 340/10.5 |
| 2013/0217332 A1 | 8/2013 | Altman et al. | |
| 2013/0269019 A1* | 10/2013 | Garmark | H04L 63/0823 726/9 |
| 2014/0068704 A1* | 3/2014 | Grewal | G06F 21/606 726/1 |
| 2014/0314921 A1* | 10/2014 | Kuempel | A47J 31/5255 426/231 |
| 2015/0244620 A1* | 8/2015 | Lo | H04L 25/4908 370/392 |
| 2015/0319555 A1* | 11/2015 | Cordeiro | H04W 56/001 455/41.2 |
| 2016/0119301 A1* | 4/2016 | Thilgen | H04L 41/0893 726/1 |
| 2016/0371452 A1 | 12/2016 | Landrum et al. | |
| 2016/0373917 A1 | 12/2016 | Logue et al. | |
| 2017/0124853 A1 | 5/2017 | Mehta et al. | |
| 2017/0164193 A1 | 6/2017 | Bicket et al. | |
| 2017/0187783 A1 | 6/2017 | Pogorelik et al. | |
| 2017/0208564 A1* | 7/2017 | Lee | H04W 4/80 |
| 2017/0214973 A1* | 7/2017 | Slaughter | H04N 21/4882 |
| 2017/0264712 A1* | 9/2017 | Magnusson, Jr. | H04L 67/146 |
| 2017/0303071 A1* | 10/2017 | Haverinen | H04B 17/27 |
| 2017/0303119 A1 | 10/2017 | Ogura et al. | |
| 2017/0374533 A1* | 12/2017 | Batra | H04W 74/08 |
| 2018/0045666 A1 | 2/2018 | Sims | |
| 2018/0184268 A1 | 6/2018 | Stitt et al. | |
| 2018/0373661 A1* | 12/2018 | Shanley | G06F 13/4027 |
| 2019/0274030 A1* | 9/2019 | Bidot | H04W 12/08 |
| 2020/0028946 A1* | 1/2020 | Vora | H04L 1/1874 |
| 2021/0136540 A1* | 5/2021 | Harmon | H04W 4/38 |
| 2021/0266805 A1* | 8/2021 | Lee | H04W 8/005 |

OTHER PUBLICATIONS

International Searching Authority Notification of Transmittal of the International Search Report and the Written Opinion of the International Searching Authority, or the Declaration, dated Feb. 9, 2021, pp. 14.

International Searching Authority Notification of Transmittal of the International Search Report and the Written Opinion of the International Searching Authority, or the Declaration, dated Jan. 29, 2021, pp. 12.

Nguyen Dung et al: "A Reliable and Efficient Wireless Sensor Network System for Water Quality Monitoring".

* cited by examiner

CONNECTIONLESS OBTAINMENT OF DYNAMIC INFORMATION OVER WIRELESS TRANSMISSION

CROSS REFERENCE TO RELATED APPLICATION

This application claims priority to U.S. Provisional Patent Application Ser. No. 62/929,603, filed on Nov. 1, 2019, and entitled "CONNECTIONLESS OBTAINMENT OF DYNAMIC INFORMATION OVER WIRELESS TRANSMISSION," the contents of which are incorporated by reference herein.

FIELD

This application relates generally to obtaining information over a wireless transmission, and, more particularly, to obtaining information from devices through data formatted in view of a central protocol structure over a wireless transmission, without establishing a direct connection.

BACKGROUND

Obtaining information from instruments or devices, for example, instruments or devices that provide measurement values is important. The information may provide indications of parameters that are important to monitor and track. For example, the instrument may be designed for measuring water parameters (e.g., chlorine, pH, fluoride, turbidity, etc.) that are important indicators of water quality. As another example, the instrument may be designed for detecting and measuring contaminants or parameters that would indicate contaminants in a water source, machine effluent, facility effluent, or the like. While the primary examples used here throughout are focused on water quality or water instruments, it should be understood that the described system and method can be applied to any instruments or devices that can obtain and transmit information. For example, as another example, the instrument or device may be designed for measuring parameters of a system, where the parameters can be used to identify if the system is working properly or may need cleaning or maintenance performed. In order to obtain the information from the instrument or other device, a person generally has to make a connection to the instrument or device to pull the information from the instrument or device.

BRIEF SUMMARY

In summary, one embodiment provides a method for transferring information from at least one instrument to an application, comprising: establishing a central protocol structure, wherein the central protocol structure defines a format for information transmitted utilizing the central protocol structure; receiving, at the application and over a wireless communication channel information from the at least one instrument, wherein the information is formatted in view of the central protocol structure; and performing, within the application, an action with respect to the information within the application, wherein the performing comprises deciphering the information contained in view of the central protocol structure.

In another embodiment, a method for transferring information from at least one device to an application includes establishing a central protocol structure, wherein the central protocol structure defines a format for information transmitted utilizing the central protocol structure; transmitting over a short-range wireless communication channel information from the at least one device to the application, wherein the information is formatted in a broadcast packet in view of the central protocol structure; receiving, at the application, and over a short-range wireless communication channel, information from the at least one device; and performing, within the application, an action with respect to the information within the application, wherein the performing comprises deciphering the information contained in view of the central protocol structure.

Another embodiment provides an information handling device for transferring information from at least one instrument to an application, comprising: a processor; and a memory device that stores instructions executable by the processor to: establish a central protocol structure, wherein the central protocol structure defines a format for information transmitted utilizing the central protocol structure; receive, at the application and over a wireless communication channel information from the at least one instrument, wherein the information is formatted in view of the central protocol structure; and perform, within the application, an action with respect to the information within the application, wherein the performing comprises deciphering the information contained in view of the central protocol structure.

A further embodiment provides a product for transferring information from at least one instrument to an application, comprising: a storage device that stores code, the code being executable by a processor and comprising: code that establishes a central protocol structure, wherein the central protocol structure defines a format for information transmitted utilizing the central protocol structure; code that receives, at the application and over a wireless communication channel information from the at least one instrument, wherein the information is formatted in view of the central protocol structure; and code that performs, within the application, an action with respect to the information within the application, wherein the performing comprises deciphering the information contained in view of the central protocol structure.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
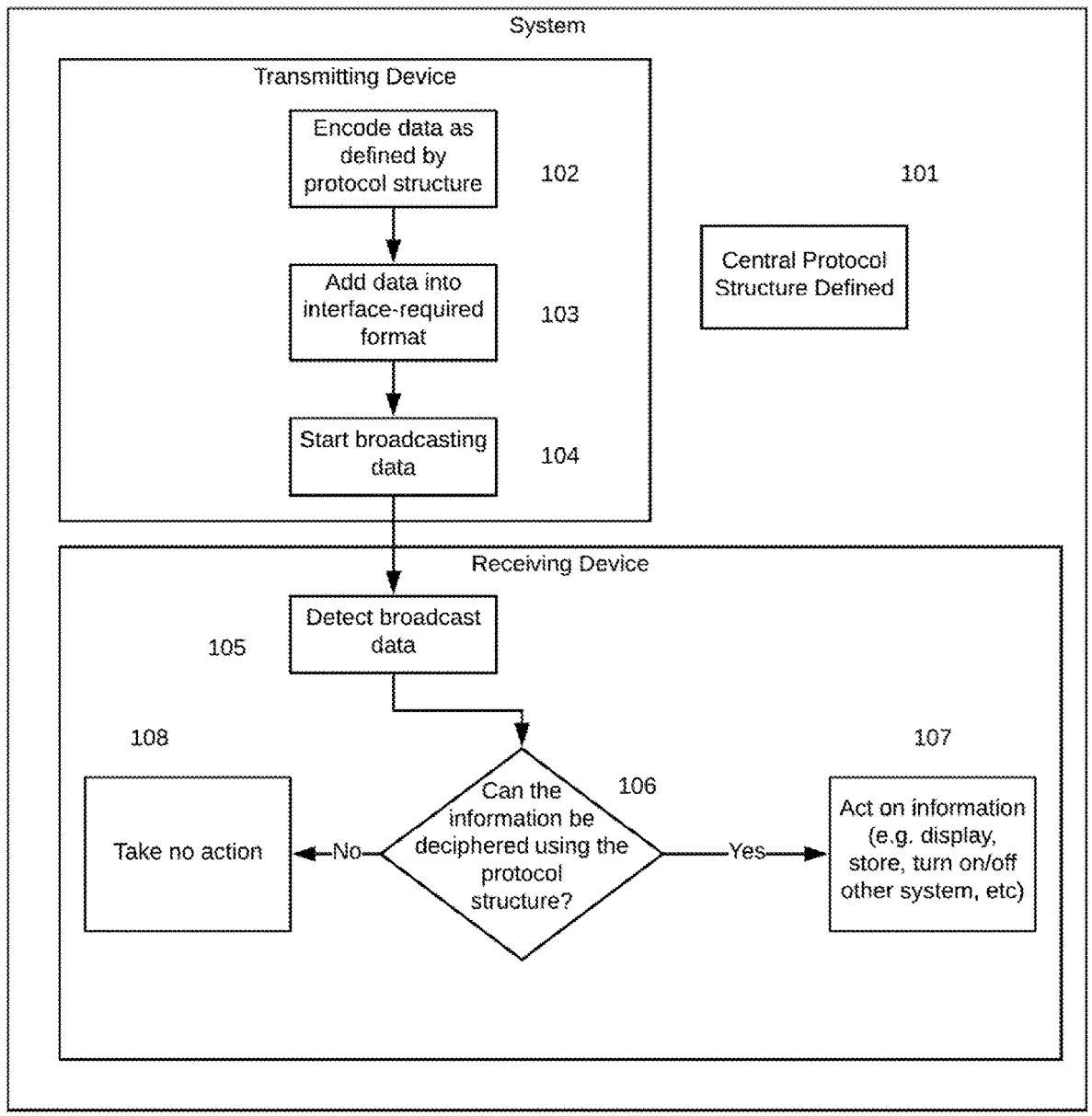
FIG. 1 illustrates an example flow diagram for obtaining information from an instrument through a wireless transmission utilizing a central protocol structure.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Generally, each instrument or device is designed for measuring a single or only a few parameters. The term instrument will be used here throughout to increase readability, but it should be understood that this term is not intended to be limiting and can include any device that a user may want to receive information from. Thus, a facility or instrument location may have many different instruments that are in proximity to one another, with each instrument designed for measuring a particular parameter. The information from all of these instruments together can provide an overall picture regarding the health or operation of a system, water source, machine, facility, or the like. With all of these instruments in a single location, it can be difficult to determine what information from what instrument would be best for a user. For example, if the system is experiencing a problem, it may be difficult for a user to determine what instrument is providing information that identifies the cause of the problem. Since conventional systems require that a user make a connection, or targeted interaction, with an instrument, the user may have to connect with every instrument to obtain information that is useful to the user.

Additionally, making a connection, or targeted interaction, with the instrument takes time and the user is unable to obtain information from the instrument without making this connection. Additionally, the number of direct connections that can be made simultaneously is limited and, once a direct connection is made, other systems, devices, users, or the like, are unable to connect to the instrument/device at the same time. Since there are generally many different instruments within a single instrument location, connecting to each of these instruments individually can take a significant amount of time. Additionally, since the information cannot be obtained until a connection to the instrument is made the user cannot determine beforehand whether a connection to the instrument needs to be made at all. In other words, the user may connect to the instrument to collect or look at the information being provided by the instrument and determine that the information was not useful to the user. However, this cannot be determined until the connection to the instrument is made, thereby resulting in the user wasting time. Additionally, since the information is unknown unless a connection to the instrument is active, the information that the user knows may become quickly outdated. For example, if the user connects to an instrument and obtains the information from the instrument, disconnects from the instrument, and the instrument performs an updated measurement, the user no longer has the most updated information.

Accordingly, an embodiment provides a system and method for obtaining information from an instrument through a wireless transmission utilizing a central protocol structure. The system establishes a central protocol structure, also referred to as a wire protocol, which defines a format for information that is transmitted utilizing the central protocol structure. The central protocol structure is known to both the instruments/devices and a central device, for example, an application running on a mobile device, remote computer, over a network, or the like. In other words, both the instruments/devices and central device know the format for information transmitted utilizing the central protocol structure.

In one embodiment, as information is transmitted by the instrument over a wireless communication channel, such as a short-range or Bluetooth® channel, the information is contained within a broadcast packet, for example, an advertising packet, that is formatted per the central protocol structure. An advertising packet can include both advertising and scan response packets, both including advertising data or information. While the term advertising packet is used for ease of readability, any broadcast packet can be utilized and the system does not require the explicit use of an advertising packet. The broadcast packet type that is used, is generally based upon the wireless transmission type.

As the application or central device receives the broadcast/advertising packet, the application can decipher the information utilizing the format of the central protocol structure and then display, or otherwise act upon, the information received by the instrument. Thus, the user never has to make a direct connection to the instrument to obtain the information and, since the central protocol structure can be an encrypted protocol, the security of the information can be maintained. The user can then decide what instrument, if any, the user wants to make a direct connection to in order to obtain more detailed information. Additionally, since a direct connection is not required, the number of devices that the user can receive transmissions from is limitless and multiple users and/or devices can receive the information at the same time since the information is being broadcast. In an embodiment, the application receives information from a number of instruments, wherein the number of instruments the application can receive information from at a single time is greater than 10 instruments, 20 instruments, 50 instruments, or 100 instruments. The application may be contained, or in communication with, a device such as a cellular phone, tablet, or the like, that allows a user to view data from the instruments.

The illustrated example embodiments will be best understood by reference to the figures. The following description is intended only by way of example, and simply illustrates certain example embodiments.

Referring to FIG. 1, an example system and method for obtaining information from an instrument through a wireless transmission utilizing a central protocol structure. At 101, a central protocol structure, also referred to as a wire protocol, has been defined for the system. The central protocol structure defines a format for information that is transmitted utilizing the central protocol structure. The wire protocol is established between both the instruments and a central device or application. In other words, the format defined by the central protocol structure is known to any of the devices, systems, or applications that will be sending, receiving, or otherwise manipulating information that is formatted per the central protocol structure. In order to maintain security of information transmitted utilizing the central protocol structure, the central protocol structure may include encryption. In this case, the central protocol structure identifies how information will be encrypted so that it can be decrypted by a system, device, or application that is also utilizing the central protocol structure, upon receipt of the information.

The central protocol structure can be a known wire protocol, for example a GOOGLE® protocol buffer, or may be specially defined or created for a facility, instrument set, application, or the like. Even if the wire protocol is a known wire protocol, the user or system customizes the wire protocol to define what information is included in the wire protocol, where the information within the wire protocol is included, and the like. In other words, a user or system must set up the wire protocol for the use case. Therefore, while a standard wire protocol may define how many bytes can be included, how data packets are divided and defined, and the like, the user or system must identify what information each of the data packets and/or bytes transmitted using the wire protocol correspond to. For example, the user may define that the first data packet or byte transmitted using the wire protocol may correspond to the instrument identifier. Thus, when the data packet is received by another instrument, central device, system, or application (collectively referred to as "application" herein for ease of readability), that application knows that the information included in that data packet corresponds to the instrument identifier. Depending on the size of the data packets, data packets may include more than one piece of information. For example, the data packet may include both the instrument identifier and timestamp information.

When the instrument has information to be transmitted or provided, the instrument can format the information in view of the central protocol structure or format the information per the format defined by the central protocol structure at 102. The instrument or transmitting device can then add the data, for example, encoded data, to advertising data at 103. In other words, the transmitting device can place the information within the broadcast packet at 103. The instrument can then broadcast the advertising data within the broadcast packet at 104. Different information can be placed within the advertising packet, for example, the information defined by the central protocol structure, in the location and format defined by the central protocol structure. Putting the information may include serializing the information into byte data and inserting the information into the broadcast packets defined by the communication channel, for example, an advertising packet defined by the Bluetooth® peripheral.

At 105, the receiving device may receive a broadcast packet, for example, an advertising packet, from at least one transmitting device or instrument. An advertising packet is effectively a broadcast packet that can be transmitted by a device with broadcasting capabilities. In other words, an advertising, or broadcast, packet can be transmitted by a device regardless of whether another device is requesting the packet or even within proximity to receive the packet. Thus, the application or system that is receiving the broadcast packet does not have to be directly connected to the instrument to receive the information contained within the broadcast packet, thereby, reducing the length of time required to obtain the information.

Additionally, since the broadcasting occurs on a wireless communication channel, the information can be obtained by an application via the wireless communication channel without requiring a wired or direct connection to the instrument. The wireless communication channel may include a near-field wireless communication channel, short-range wireless communication channel, long-range wireless communication channel, or the like. For example, the wireless communication channel may include Bluetooth® or other short-range communication channel, a wireless network, or the like. The short-range wireless communication channel may use UHF radio waves, which may be in the range of between 2.400 and 2.4835 GHz. Depending on the wireless communication channel, the receiving device having the application may have to be within a predetermined proximity of the instrument. For example, a user may be carrying a mobile device (such as a cellular phone or a tablet) that includes the application and, in the case that the wireless communication channel is a Bluetooth® channel, the user may have to be within a short distance of the instrument(s). In one embodiment, the wireless communication channel is not a cellular, ethernet, or WiFi network.

The information included within the broadcast packet may include, but is not limited to, instrument identifiers or other identification information, measurement data obtained by the instrument, timestamp information which may identify when the broadcast packet was created/transmitted or may identify when the measurement data was obtained, parameters of the instruments or devices of the instrument (e.g., probes, sensors, meters, lamps, etc.), a combination thereof, or the like. The instrument may be a configured to test a sample of water, either in a laboratory sample or in a continuous water flow, such as in a drinking water or wastewater treatment plant. Measurement data may include any data that the instrument is designed to capture, for example, pH values of a water source, turbidity values of a fluid, lamp intensity output, specific indicator (e.g., chlorine, fluoride, iron, etc.) values, or any other measurement data. Parameters of the instruments may include information identifying what is being measured by the instrument, ranges or scales of the measurement data, measurement data unit information, information identifying what is being measured by each device of the instrument, and the like. In other words, the type of information that may be included in the broadcast packet can be any type of information and may vary across different instruments. In one embodiment, the instrument does not include a user interface and the user interacts with the device/instrument (such as receiving information from the device/instrument) via the wireless connection between the device/instrument and the application.

Since the instrument creates the broadcast packet, the broadcast packet can be dynamically updated as new information is produced by the instrument, for example, a new measurement is taken. Thus, the broadcast packet contains information that is substantially provided in real-time, with the only lag being the time to create the broadcast packet and a timing policy that indicates how frequently a broadcast packet should be generated. The timing policy may be a default policy or may be programmed by a user and each instrument may have a different timing policy. The timing policy may indicate that an broadcast packet should be generated and broadcast and a predetermined time interval (e.g., every two seconds, every minute, etc.), upon receipt of a trigger event (e.g., new measurement data is obtained, upon detection of a receiving device in proximity to the instrument, etc.), a combination thereof, or the like.

Additionally, since each device creates its own broadcast packet, there is no limit to how many broadcast packets can be received by the application. In other words, using conventional systems that require a direct connection, the application is limited to how many devices it may be connected to at a single time. Since the described system does not require a direct connection to receive the broadcast packets, and, therefore, the instrument information, there is no limit to the number of device that the application can receive information from at a single time. Additionally, since the information is contained within a broadcast packet, there is no limit to the number of devices or applications that can receive the broadcast packet at a single time.

At 106, the system determines if the broadcast packet, and, therefore, the information, can be deciphered using the central protocol structure. This determination may include determining whether the broadcast packet is formatted per the format defined by the central protocol structure. If the broadcast packet cannot be deciphered using the central protocol structure, the system may take no action at 108. If, on the other hand, the broadcast packet can be deciphered using the central protocol structure, the system may decipher the information and perform an action with respect to the information at 107. Performing an action may include deciphering the information based upon the format defined by the central protocol structure. Deciphering may include de-serializing the information. Additionally, if the information is encrypted per the central protocol structure, the deciphering may also include decrypting the information utilizing the encryption protocol or algorithm defined by the central protocol structure.

Upon deciphering the broadcast packet, the information can be read by the application so that it can be acted upon, for example, displayed (e.g., within a window of the application, on a display screen associated with the application, etc.), stored, utilized to manipulate another system (e.g., turn off another system, trigger an event on another system, etc.), or the like. The application may be contained, or in communication with, a device such as a cellular phone, tablet, or the like. It should be understood that any type of graphical user interface or application that has been created to display information can be used. Accordingly, the format of how the information is displayed may vary based upon the programming of the application. Since the broadcast packet, and, therefore, information contained within the broadcast packet, can be dynamically updated, the information acted upon can also be dynamically updated, for example, every time a broadcast packet is updated. Additionally, in the event that the information is displayed, the displayed information can also be dynamically updated. Thus, the information displayed within the application can be updated as frequently as the broadcast packet and may provide almost real-time instrument information.

The system may also take additional or alternative actions other than simply displaying the information in the application. The system and/or application may use the information to perform some function or take some action. For example, the system and/or application may store the information to be used in historical trending, continuous device monitoring, to be used by another system or device, or the like. As another example, the system and/or application may analyze the information and, based upon the analysis, perform an action in response to the information. In other words, the system and/or application can make a decision with regard to the instrument, device, or system based upon the information. For example, based upon the information, the system and/or application may send a signal to turn on/off the instrument or device or another instrument, device, or system, request a new measurement from the instrument or device, change a parameter on the instrument or device or other instrument, device, or system, or the like. As another example, the information may be used by the application to make a decision and trigger another event, such as activating or deactivating another system or device.

The various embodiments described herein thus represent a technical improvement to conventional techniques for obtaining information from instruments. Rather than having to connect to every instrument to receive information, the described system and method provides a technique that allows a user to obtain information from instruments without making a connection to the instrument. Additionally, since a direct connection does not have to be made, the system can receive information from multiple instruments at the same time without a limit to the number of instruments that information can be received from at a single time. The lack of a direct connection also means that data from a transmitting device can be received and acted upon by multiple other devices. This allows a user, or multiple users simultaneously, to determine what, if any, instrument or devices the user(s) may want to make a direct connection to in order to get more detailed information without having to directly connect to every instrument. Thus, the described system provides a technique that is more efficient than conventional techniques while still maintaining security of the information.

Figure 2:
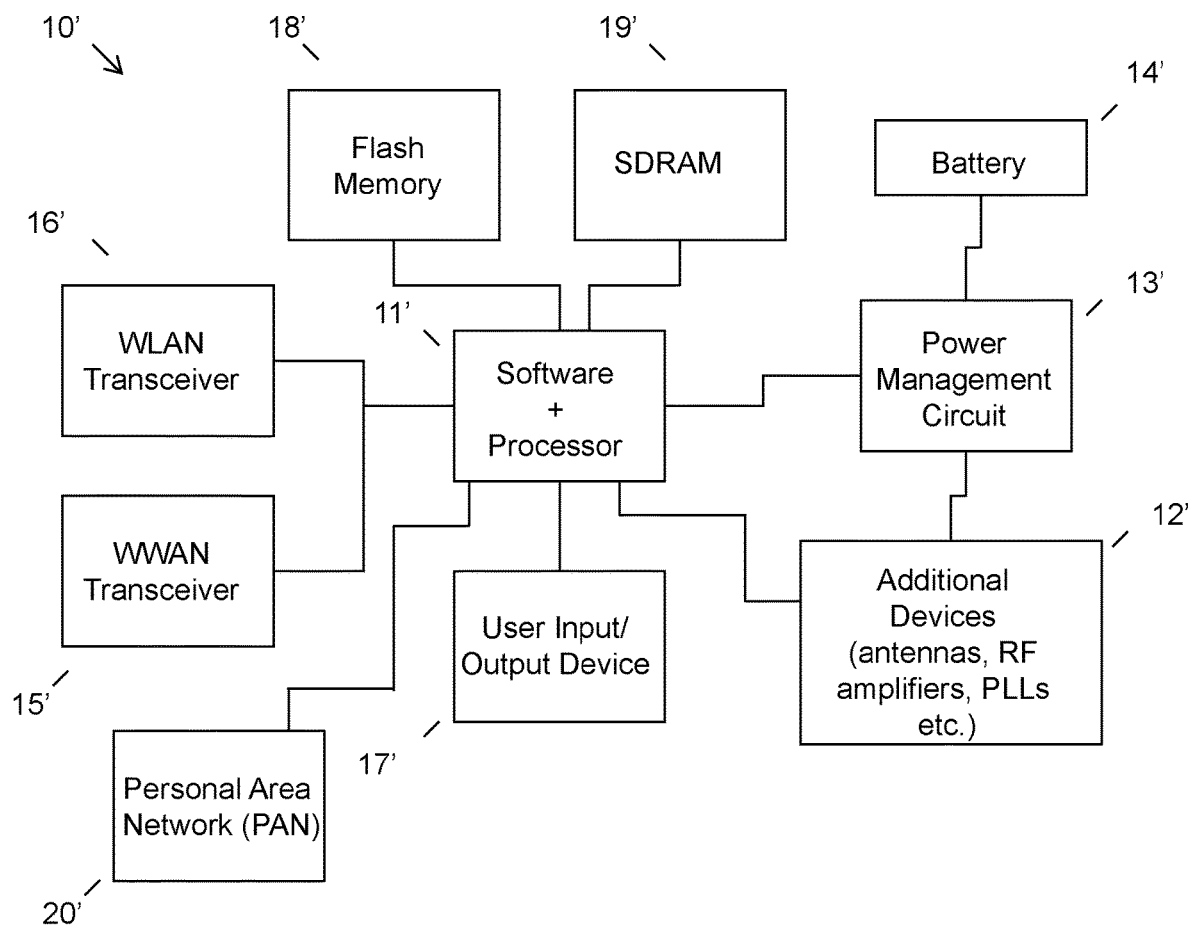
FIG. 2 illustrates an example of computer circuitry.

While various other circuits, circuitry or components may be utilized in information handling devices, with regard to an instrument for total chlorine measurement in seawater according to any one of the various embodiments described herein, an example is illustrated in FIG. 2. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. The system 10' may also include transmission devices for a personal area network 20', for example, BLUETOOTH®. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform total chlorine measurement of a sample of seawater.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN), a wide area network (WAN), personal area connection (PAN), or the connection may be made through other devices (for example, through the Internet using an Internet Service Provider), through wireless transmissions, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for transferring information from at least one instrument to an application running on a central device, comprising:
setting up a central protocol structure, wherein the establishing comprises creating a unique central protocol structure, wherein the central protocol structure is unique for a system comprising the at least one instrument and the application and is customized for a transfer of information between the at least one instrument to the application, wherein the creating comprises defining a format for information transmitted utilizing the central protocol structure, wherein the defined format identifies what information is transmitted in each data packet of the central protocol structure and a location of each data packet within the central protocol structure;
receiving, at the application, and over a short-range wireless communication channel, information from the at least one instrument, wherein the information is contained within a broadcast packet and formatted, by the at least one instrument, per the central protocol structure, wherein the broadcast packet is broadcast regardless of whether the application received the broadcast packet; and
performing, within the application, an action with respect to the information within the application, wherein the performing comprises deciphering, at the application, the information contained within the broadcast packet utilizing the format of the central protocol structure.

2. The method of claim 1, wherein the short-range wireless communication channel uses UHF radio waves.

3. The method of claim 1, wherein the wireless communication channel comprises a short-range communication channel and the broadcast packet comprises an advertising packet.

4. The method of claim 1, wherein the information is dynamically updated as the at least one instrument changes data.

5. The method of claim 4, wherein the performing an action comprises displaying the information and wherein the information displayed within the application is dynamically updated as the information is dynamically updated.

6. The method of claim 1, wherein the application receives the information without connecting to the at least one instrument.

7. The method of claim 1, wherein the formatting the information comprises serializing the information into byte data per the format defined by the central protocol structure.

8. The method of claim 7, wherein the deciphering comprises de-serializing the information per the format defined by the central protocol structure.

9. The method of claim 1, wherein the central protocol structure comprises an encrypted protocol buffer that encrypts information transmitted utilizing the central protocol structure; and wherein the performing comprises decrypting the information.

10. The method of claim 1, wherein the application receives information from a number of instruments, wherein the number of instruments the application can receive information from at a single time is greater than 20 instruments.

11. The method of claim 1, wherein the information comprises at least one of: an instrument identifier, measurement data obtained by the instrument, timestamp information, and a parameter of the instrument.

12. The method of claim 1, wherein the defining comprises utilizing a known wire protocol and customizing the known wire protocol for the system.

13. An information handling device for transferring information from at least one instrument to an application running on a central device, comprising:
a processor; and
a memory device that stores instructions executable by the processor to:
set up a central protocol structure, wherein the establishing comprises creating a unique central protocol structure, wherein the central protocol structure is unique for a system comprising the at least one instrument and the application and is customized for a transfer of information between the at least one instrument to the application, wherein the creating comprises defining format for information transmitted utilizing the central protocol structure, wherein the defined format identifies what information is transmitted in each data packet of the central protocol structure and a location of each data packet within the central protocol structure;
receive, at the application and over a short-range wireless communication channel information from the at least one instrument, wherein the information is contained within a broadcast packet and formatted, by the at least one instrument, per the central protocol structure, wherein the broadcast packet is broadcast regardless of whether the application received the broadcast packet; and
perform, within the application, an action with respect to the information within the application, wherein the performing comprises deciphering, at the application, the information contained within the broadcast packet utilizing the format of the central protocol structure.

14. The information handling device of claim 13, wherein the information is dynamically updated as the at least one instrument changes data.

15. The information handling device of claim 13, wherein the performing an action comprises displaying the information and wherein the information displayed within the application is dynamically updated as the information is dynamically updated.

16. The information handling device of claim 13, wherein the application receives the information without connecting to the at least one instrument.

17. The information handling device of claim 13, wherein the formatting the information comprises serializing the information into byte data per the format defined by the central protocol structure.

18. The information handling device of claim 17, wherein the deciphering comprises de-serializing the information per the format defined by the central protocol structure.

19. The information handling device of claim 13, wherein the central protocol structure comprises an encrypted protocol buffer that encrypts information transmitted utilizing the central protocol structure; and wherein the performing comprises decrypting the information.

20. The information handling device of claim 13, wherein the wireless communication channel comprises a short-range communication channel and the broadcast packet comprises an advertising packet.

21. The information handling device of claim 13, wherein the instrument is configured for testing a quality of a sample of water.

22. A product for transferring information from at least one instrument to an application, comprising:
a storage device that stores code, the code being executable by a processor and comprising:
code that sets up a central protocol structure, wherein the establishing comprises creating a unique central protocol structure, wherein the central protocol structure is unique for a system comprising the at least one instrument and the application and is customized for a transfer of information between the at least one instrument to the application, wherein the creating comprises defining a format for information transmitted utilizing the central protocol structure, wherein the defined format identifies what information is transmitted in each data packet of the central protocol structure and a location of each data packet within the central protocol structure;
code that receives, at the application and over a wireless communication channel information from the at least one instrument, wherein the information is contained within a broadcast packet and formatted, by the at least one instrument, per the central protocol structure, wherein the broadcast packet is broadcast regardless of whether the application received the broadcast packet; and
code that performs, within the application, an action with respect to the information within the application, wherein the performing comprises deciphering, at the application, the information contained within the broadcast packet utilizing the format of the central protocol structure.

* * * * *